July 2, 1935.  R. C. L. P. TURGOT  2,006,418
BRAKE ADJUSTING DEVICE
Filed May 27, 1931  2 Sheets-Sheet 2

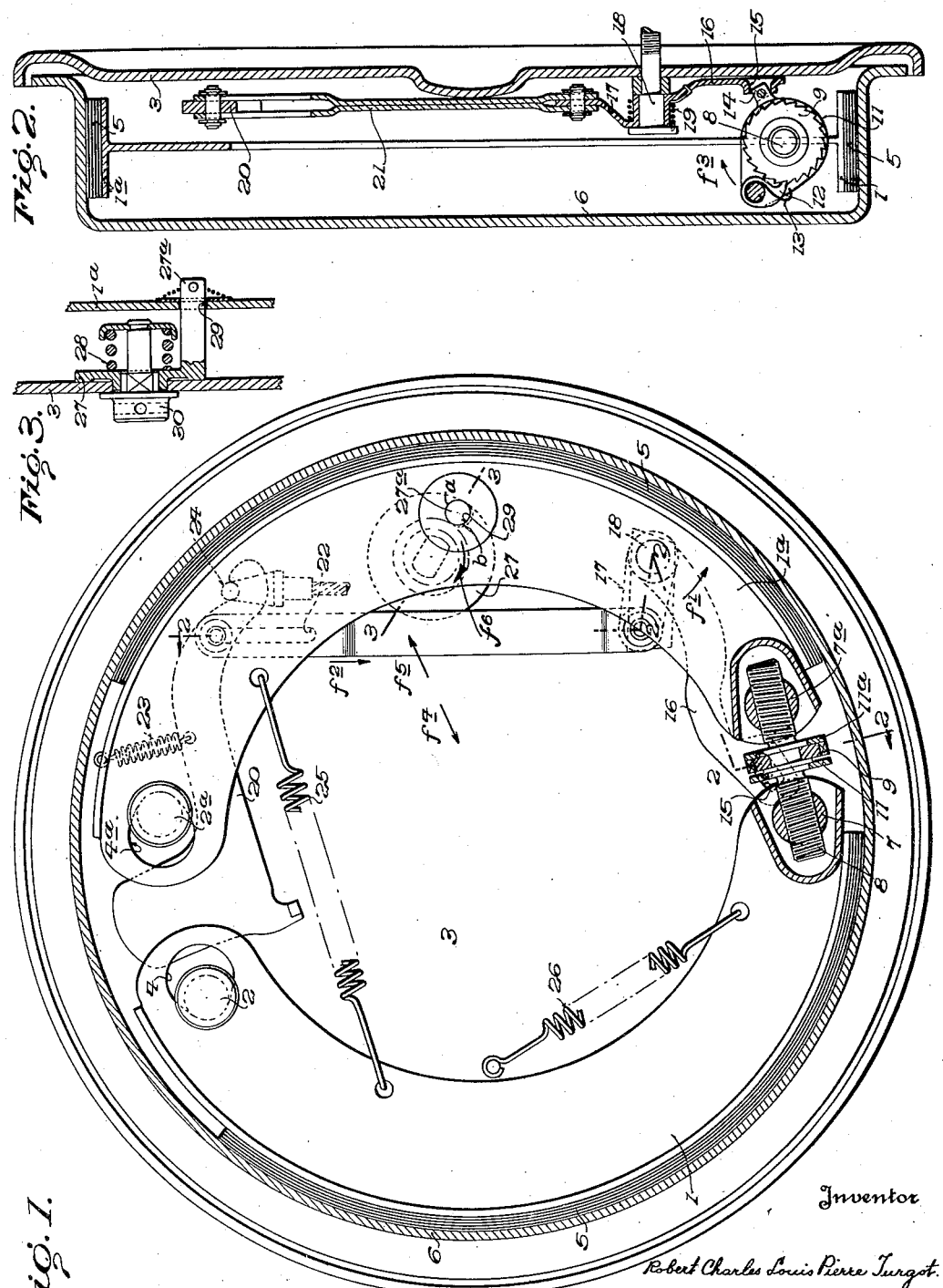

Inventor
Robert Charles Louis Pierre Turgot.
By M. W. McConkey
Attorney

Patented July 2, 1935

2,006,418

UNITED STATES PATENT OFFICE 2,006,418

BRAKE ADJUSTING DEVICE

Robert Charles Louis Pierre Turgot, Paris, France, assignor to Bendix Brake Company, South Bend, Ind., a corporation of Illinois Application May 27, 1931, Serial No. 540,418
In France May 27, 1930

16 Claims. (Cl. 188—79.5)

This invention relates to brakes and more particularly to adjusting means for internal expanding brakes.

It is well known in the internal expanding brake art to provide means for effecting the adjustment of the position of the brake shoes with respect to the brake drum. Such adjustment is necessitated by the wear of the brake lining which enlarges the distance between the face of the lining and the inner periphery of the drum, thereby causing a weaker braking action for a given movement of the brake actuating means. In the past such adjustment has been by hand, necessitating a great amount of manipulation and usually resulting in improper adjustment.

It is an object of this invention to provide means for automatically adjusting the positions of the brake shoes, in brakes of the type employing shoes connected together by a rod having inverse screw-threads and screwing into the ends of the shoes.

Another object of this invention is to provide means for adjusting the positions of the brake shoes with respect to the brake drum which means are actuated by mechanism responsive to the brake operating means provided for the brake shoes.

Another object of this invention is to provide adjusting means for brake shoes the adjusting movement of which will be proportional to the displacement of the shoes in brake operating movement.

A further object of the invention is to provide adjusting means for brakes the adjusting movement of which will be proportional to the wear of the brake lining.

A still further object of the invention is to provide adjusting means for brakes in which the adjustment effecting means will be connected to the brake shoes by a plurality of means, the ratio of which is such that for a minimum determined play between the facing and the drum the movement of the brake shoes will not actuate the adjustment effecting device.

Other objects and features of novelty will be apparent from the following detailed description when taken in connection with the accompanying drawings. It is to be expressly understood however, that the drawings are for purposes of illustration only and are not designed as a definition of the limits of the invention, reference being had for this purpose to the appended claims.

In the drawings wherein similar reference characters refer to like parts throughout the several views:

Fig. 1 is an elevational view of a regulating device according to the invention as applied to a motor vehicle brake, the brake drum being shown in section.

Fig. 2 is a sectional view of said device on the line 2—2 of Fig. 1.

Fig. 3 is a section of the device on the line 3—3 of Fig. 1.

Figure 4:
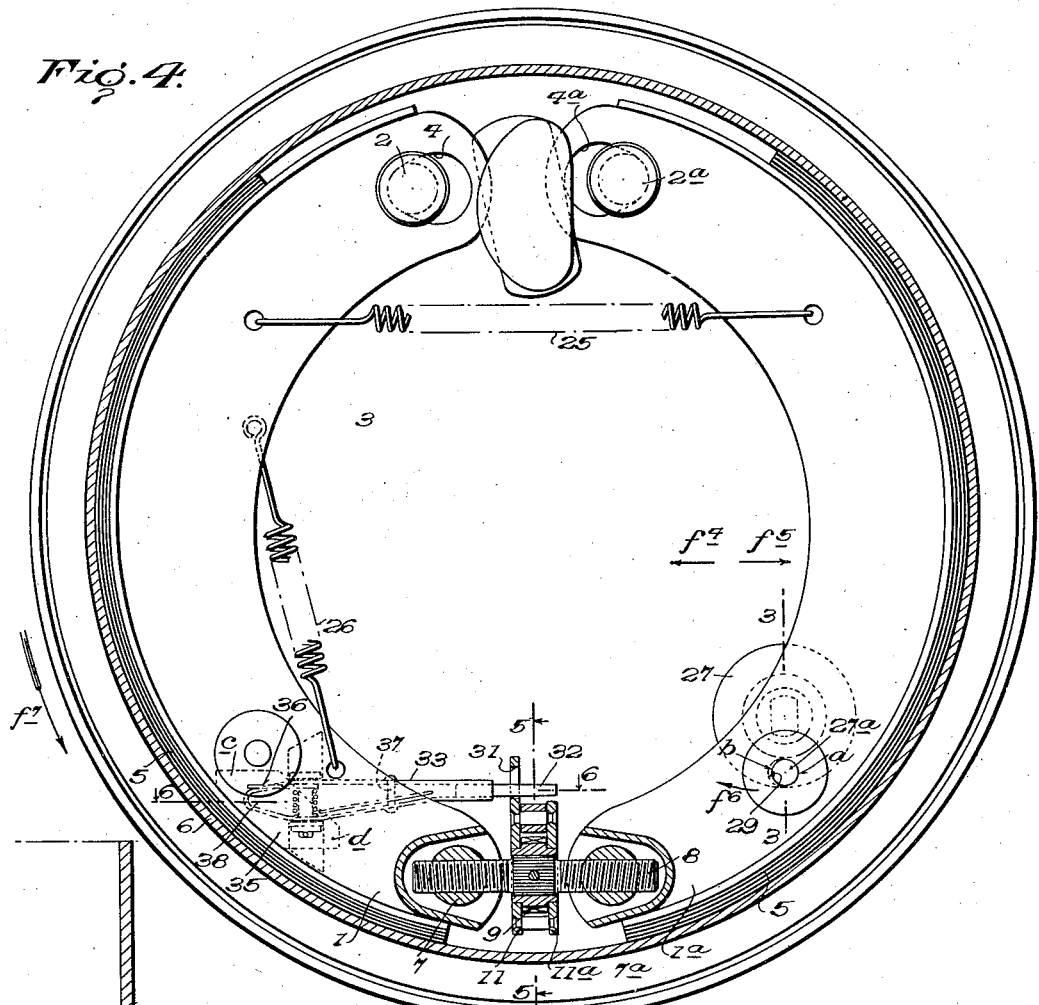
Fig. 4 is an elevational view of a modified form of the regulating arrangement in which the controlling means differ from the preceding.

In the form of construction shown in Figs. 1 to 3, the brake comprises two expanding members or shoes $I$ and $I^a$ which are pivoted at one end upon respective anchor members 2 and $2^a$ mounted on the brake disk 3, the construction allowing the shoes to be separated from the anchors to a limited degree. For this purpose, said anchors extend through respective apertures 4—$4^a$ of larger diameter in said shoes; the apertures are preferably cut out on the side farthest from the ends of the shoes, according to the arc of a circle whose radius is practically equal to the radius of the anchors 2—$2^a$, so that the shoes $I$ and $I^a$ will have a well-defined position when said anchors are in contact with the edges of said cut-out part. Facing members 5—5 are mounted on the shoes, and due to their great coefficient of friction, they effect the braking when applied against a drum 6 secured to the wheel.

The said shoes $I$ and $I^a$ are connected together by two tapped sockets 7—$7^a$ secured to the ends of the shoes $I$—$I^a$, and cooperating with a rod 8 whose ends are screwed into the respective sockets. The ends of said rod have respectively right and left hand threads, and thus when the said rod is turned in the proper direction, this moves the two sockets 7—$7^a$ apart, hence separating the shoes $I$—$I^a$. A ratchet wheel 9 is secured to the rod 8, it being disposed between two plates $II$—$II^a$ which are rotatable on the rod 8 and are concentric therewith; a pawl 12 (Fig. 2) is pivotally mounted on said plates and is disposed between the two plates. A spring 13 is attached at one end to one of the plates $II$ and at the other end to said pawl 12, thus urging the pointed end of the pawl into engagement with the ratchet wheel 9 which can be thus driven forward tooth by tooth by the said pawl.

One of the plates $II$ or $II^a$ (or both plates)

carries a controlling stud 14 engaged in an aperture 15 in the arm 16 of a two-arm lever; the two arms 16—17 of said lever are pivoted to an axle 18 secured to the brake-disk 3. A spring 19 attached at one end to the axle 18 and bearing at the other end upon the arm 16 of the lever, urges said lever in the opposite direction of the arrow $f^1$; the lever 16—17 is connected to a lever 20 controlling the spacing of the shoes, or to any other part movable in the same manner as the lever 20, by a link 21, which latter may be slotted at 22 in order to allow a certain amount of free or normal motion to the lever 20 during which it will not drive said link in the direction of the arrow $f^2$. A spring 23 which is attached at one end to the brake disk 3 and at the other end to the lever 20, urges said lever into the inoperative position and against any suitable abutment. Two reaction springs are employed, whereof one 25 is attached at its ends to the respective shoes 1 and 1ª, and the other is attached at one end to the brake disk 3, and at the other end to one of the shoes 1, and it tends to return the shoes 1 and 1ª into the inoperation position, as shown in Fig. 1, in which the axles 2—2ª are in contact with the inner edges of the apertures 4—4ª.

The brake further comprises an abutment automatically adjustable, which assures the proper centering of the shoes 1—1ª when in the inoperative position and prevents them from moving about in the directions of the arrows $f^4$ and $f^5$. A disk 27 carrying an eccentric stud 27ª (Figs. 1 and 3) exercises a strong friction on the brake disk 3 by the compression due to a heavy spring 28, a concave spring washer, or other elastic means. The stud 27ª extends through an aperture 29 in the shoe 1ª. In the present construction, the diameter of said aperture exceeds the diameter of the stud by an amount sufficient to obtain the necessary play between the facing member 5 and the drum 6, which play is determined in advance. The disk 27 is also keyed to a controlling knob 30, so that it may be regulated from the exterior.

The operation of the said apparatus is as follows. The lever 20, starting from its initial position which has been determined according to the fixed length of the control, will turn in the direction of the arrow $f^2$ (Fig. 1) until the facing members 5 are applied upon the drum 6. Should the lining be worn, the lever 20 will have an abnormal movement and engage the right-hand end of the slot 22, and further movement will actuate the link 21, and lever 17 and 16 against the action of the spring 19. The lever arm 16 will rock the pawl carrier 11 through the arm 14, in a clockwise direction as indicated by $f^3$. If the wear has been sufficient, the pawl 13 will slip over a notch of the ratchet wheel 9.

When the braking effort ceases, the lever 20 turns contrary to the arrow $f^2$, as it is urged by the spring 23 by which the controlling device is brought back. During its reverse movement, said lever 20 may return the link 21 to its normal position after traversing the length of slot 22, or the link 21 may return by reason of the spring 19 acting on lever 16—17, in either case turning the pawl 12 contrary to the arrow $f^3$; said pawl now turns the ratchet wheel 9 and with it the rod 8, thus separating the sockets 7 and 7ª and also the shoes 1 and 1ª. The play between the facing members 5 of the shoes and the drum 6 is thus diminished. This adjustment of the play may be obtained at the time of braking instead of upon the back stroke, without departing from the principle of the invention. Any suitable stop mechanism may be used to prevent spring 19 from urging the link 21 too far to the left; for example, the projection 14 of the pawl carrier 11 may fit in the recess 15 of lever arm 16 so as to prevent further angularity or counterclockwise rotation of the pawl carrier than that shown in Figure 2.

Ordinarily the lever 20 may move through a fixed or constant stroke upon each application of the brake, the stroke being determined by the brake shoe clearance, but as wear takes place this movement increases. By suitably varying the length of levers 16, 17 and 20 as well as the pitch of the ratchet wheel 9 and of the threaded rod 8, these parts can be designed so as to give a single tooth adjustment upon a slight overtravel of lever 20 due to lining wear, thereby maintaining the brake substantially uniform in operation and continuously in proper adjustment. Due to the number of variable factors above indicated, it is easy to obtain a practical adjustment of a very minute precision, thus affording a substantially continuous adjustment.

When the shoe 1ª is moved by reason of the braking, this shoe actuates the stud 27ª by its face $b$ (Figs. 1, 3 and 4) until the facing member 5 makes contact with the drum 6. When the braking effort ceases, the spring 26 draws back the shoe 1ª, and said shoe returns until it makes contact with the face $a$ of the stud 27ª. The ratio between the forces of the springs 26 and 28 is properly determined in order that the couple of the spring 26 will be less than the friction couple of the stud 27ª upon the disk 3, and thus during the return of the shoe 1ª, the spring 26 will be unable to turn the stud 27ª in the direction of the arrow $f^6$. The return stroke of the shoe is proportional to the difference between the diameters of the aperture 29 and of said stud, and hence it has a constant value.

Figure 5:
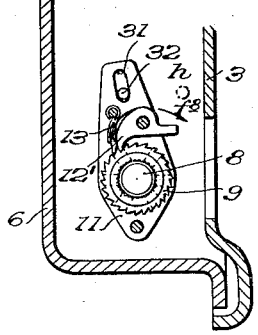
Fig. 5 is a cross section of the same on the line 5—5 of Fig. 4.
Figure 6:
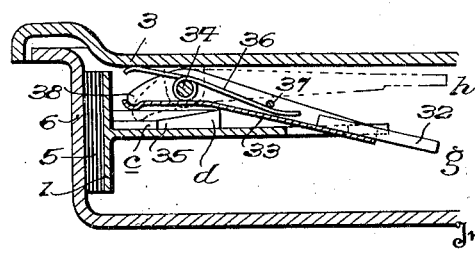
Fig. 6 is a section on the line 6—6 of Fig. 4.

Figs. 4 to 6 show a modified form of the device used for controlling the ratchet wheel. The plate 11 which supports (together with the plate 11ª) the pawl 12', is pierced with a hole 31 for the insertion of the end 32 of a controlling lever 33. Said lever 33 turns about an axle 34 mounted on the brake disk 3, and it cooperates with a cam 35 having the proper outline which is secured to the side of the web of the shoe 1. The thin part of said cam is at $c$, and the thick part at $d$. A spring 36 bearing at one end upon the brake disk 3 and at the other end upon an axle 37 mounted on the lever 33, urges the end 38 of said lever against the cam 35.

When braking during the forward travel of the vehicle, in which case the brake drum 6 turns in the direction of the arrow $f^7$ (Fig. 4), the shoe 1, and hence the cam 35, are driven in the same direction, and the inclined part of said cam acts upon the lever 33. The end 32 of said lever now moves from $g$ to $h$ (Figs. 5 and 6). The pawl 12' is thus moved according to the arrow $f^8$ (Fig. 5). When the braking action ceases, the shoes 1 and 1ª make contact with the axles 2 and 2ª under the effort of the springs 25—26. During this return movement, the cam 35 drives out the end 38 of the lever 33, and the other end 32 of said lever moves in the direction $h$—$g$, thus actuating the pawl 12 which rotates the ratchet wheel 9. The threaded rod 8 mounted on the wheel 9 thus separates the sockets 7 and 7ª, hence regulating the play between the facings 5 and the drum 6.

As in the preceding case, the parts are so regulated that the ratchet wheel will only advance by one tooth by reason of a given amount of wear of the facings 5. As appears in Figure 5, there may, if finer adjustments are desired, be two pawls 12 side by side and the end of one of which is one-half a tooth ahead of the other, so that the pawls operate alternately to make half-tooth adjustments.

While there has been shown and described one embodiment of the invention, it is to be understood that the invention is not limited thereto. Various changes in the shapes, sizes and manner of assembling the various component parts may be resorted to without departing from the scope of the invention, as will occur to those skilled in the art. Reference will therefore be had to the appended claims for a definition of the limits of the invention.

What I claim is:

1. A brake including a drum, brake shoes, a brake operating device and a brake adjusting device comprising a screw threaded rod connecting a plurality of floating brake shoes whereby rotation of said rod will effect positioning of said brake shoes and which rod has a central enlarged portion provided with external teeth, plates journaled on said rod on opposite sides of said portion and provided with a pawl mounted between them and which is spring-pressed against said teeth, a lever pivoted adjacent one of the shoes and engaging said plates and operable to oscillate them to adjust said device by a step-by-step action, and means actuated automatically during the application and release of the brake after a predetermined amount of wear to rock said lever to so adjust said device.

2. A brake comprising a brake drum, a plurality of brake shoes, a rotatable screw threaded member connecting said brake shoes, means for rotating said connecting means for effecting positioning of said shoes with respect to said drum, said last-named means including a pivoted rod and means carried by one of said brake shoes for causing swinging movement of said rod.

3. A brake comprising a brake drum, a plurality of brake shoes, means rotatable to effect positioning of said brake shoes, a cam carried by one of said brake shoes and means operable by the movement of said cam for rotating said positioning means.

4. A brake comprising a drum, a plurality of brake shoes, a screw-threaded rod connecting said brake shoes whereby rotation of said rod will effect positioning of said shoes, a slotted member on said rod, a pivoted member extending through said slotted member, a cam carried by one of said brake shoes, the movement of said cam in brake operation causing movement of said pivoted member and said slotted member to effect positioning of said shoes.

5. A brake comprising a drum, a plurality of brake shoes, a screw threaded rod connecting said brake shoes, a ratchet member rigid with said rod, a pawl member cooperating with said ratchet member, a slotted plate carrying said pawl member and rotatable with respect to said ratchet member, a pivoted rod extending through said slotted plate, a cam carried by one of said brake shoes and cooperating with said pivoted rod, whereby movement of said brake shoe in brake-applying operation will effect positioning of said brake shoes.

6. A brake comprising a brake drum, a plurality of brake shoes, a screw-threaded rod connecting said brake shoes whereby rotation of said rod will effect positioning of said brake shoes with respect to said drum, a ratchet carried by said rod and rigid therewith, a pawl co-operating with said ratchet, a plate rotatable with respect to said ratchet and carrying said pawl, a stud carried by said plate, a pivoted lever having an opening co-operating with said stud, a brake-operating device, a link connected at one end to said device and at the other end to said pivoted lever, whereby operation of said brake-operating device will effect movement of said pivoted lever, said plate, said pawl and said ratchet to effect positional adjustment of said shoes.

7. A brake comprising a drum, floating friction means therein, an actuating lever for expanding said means extending substantially circumferentially in said brake, an automatic adjustment for said brake and means including a link extending substantially at right angles to the actuating lever for operating said automatic adjustment by movements of said actuating lever, said last named means being substantially insensitive to the floating of said friction means.

8. A brake comprising a backing plate having mounted thereon a pair of shoes having webs paralleling the backing plate, an adjustment connecting the shoes, and means for operating the adjustment including a lever arranged in the space between the backing plate and the web of one of the shoes and which has a pivot carried by the backing plate and arranged opposite said web.

9. A brake comprising a backing plate having mounted thereon a pair of shoes having webs paralleling the backing plate, an adjustment connecting the shoes, and means for operating the adjustment including a lever arranged in the space between the backing plate and the web of one of the shoes.

10. A brake comprising a backing plate having mounted thereon a pair of shoes having webs paralleling the backing plate, an adjustment connecting the shoes, and means for operating the adjustment including a lever arranged in the space between the backing plate and the web of one of the shoes and which has a pivot carried by the backing plate and arranged opposite said web, together with lever-operating means mounted on said web.

11. A brake comprising a drum and a backing plate having a pair of shoes mounted thereon and which have webs paralleling the backing plate, an operating lever acting on the ends of the shoes at one side of the drum and which is arranged in the space between the backing plate and the web of one of the shoes and which swings in a plane paralleling the backing plate, means for separating the ends of the shoes at the other side of the drum, and means connecting the separating means to the lever including a link paralleling the backing plate and movable lengthwise parallel to the backing plate.

12. A brake comprising a drum and a backing plate having a pair of shoes mounted thereon and which have webs paralleling the backing plate, an operating lever acting on the ends of the shoes at one side of the drum and which is arranged in the space between the backing plate and the web of one of the shoes and which swings in a plane paralleling the backing plate, means for separating the ends of the shoes at the other side of the drum including another lever arranged in said space, and a link connecting the two levers and paralleling the backing plate and movable lengthwise parallel to the backing plate.

13. A brake comprising a drum and a backing plate having a pair of shoes mounted thereon provided with anchorage means carried by the backing plate and which have webs paralleling the backing plate, an operating lever acting on the ends of the shoes at one side of the drum and which is arranged in the space between the backing plate and the web of one of the shoes and which swings in a plane paralleling the backing plate, means for separating the ends of the shoes at the other side of the drum, and means connecting the separating means to the lever including a link paralleling the backing plate and movable lengthwise parallel to the backing plate, said shoes being arranged to shift their anchorage in opposite directions of rotation of the drum.

14. A brake comprising a drum and a backing plate having a pair of shoes mounted thereon provided with anchorage means carried by the backing plate and which have webs paralleling the backing plate, an operating lever acting on the ends of the shoes at one side of the drum and which is arranged in the space between the backing plate and the web of one of the shoes and which swings in a plane paralleling the backing plate, means for separating the ends of the shoes at the other side of the drum including another lever arranged in said space, and a link connecting the two levers and paralleling the backing plate and movable lengthwise parallel to the backing plate, said shoes being arranged to shift their anchorage in opposite directions of rotation of the drum.

15. A brake comprising a drum and a backing plate having a pair of shoes mounted thereon and which have webs paralleling the backing plate, an operating lever acting on the ends of the shoes at one side of the drum, and which is arranged in the space between the backing plate and the web of one of the shoes and which swings in a plane paralleling the backing plate, means for separating the ends of the shoes at the other side of the drum, and means connecting the separating means to the lever.

16. A brake comprising a drum and a backing plate having a pair of shoes mounted thereon and which have webs paralleling the backing plate, an operating lever acting on the ends of the shoes at one side of the drum and which is arranged in the space between the backing plate and the web of one of the shoes and which swings in a plane paralleling the backing plate, and means for separating the ends of the shoes at the other side of the drum including another lever arranged in said space.

ROBERT CHARLES LOUIS
PIERRE TURGOT.